Jan. 4, 1966 T. S. NEWTON, JR 3,226,867
FRAMING FOR TWO DIMENSIONAL PICTORIAL MATERIAL
Filed March 18, 1963

INVENTOR.
Tracy S. Newton, Jr.
BY
Newton, Hopkins & Jones
ATTORNEYS tates Patent Office 3,226,867
Patented Jan. 4, 1966

3,226,867
FRAMING FOR TWO DIMENSIONAL PICTORIAL MATERIAL
Tracy S. Newton, Jr., 609 E. Ponce de Leon Ave., Decatur, Ga.
Filed Mar. 18, 1963, Ser. No. 265,658
4 Claims. (Cl. 40—158)

This invention relates to framing for two-dimensional pictorial material and more particularly to a framing for use with two-dimensional pictorial or similar material of all types which will create or increase the illusion of depth or three dimensions.

The illusion of depth in a two-dimensional picture is created by having the near objects in the picture partially obscure the more distant objects, by grading the sizes of the objects in the picture in accordance with their varying distance, by making distant objects less distinct than near objects and by other well known techniques. Although the illusion of depth can be achieved by these characteristics of a picture, the illusion is never wholly satisfactory or convincing. As a result, various devices have been used to create or enhance the illusion of depth in two-dimensional pictures.

Typical of such devices is the well-known stereoscope which presents two slightly different views of a picture to the eyes of the viewer. The view presented each eye of the viewer is similar to the view which would be perceived by that eye if the object in the picture was actually being observed and good perception of depth is achieved. The use of two-dimensional pictures having the pictorial presentation appearing twice thereon in different colors or with different polarizations and in slightly different positions and of eye glasses which cause each eye to see a different pictorial presentation also results in a good illusion of depth.

However, these devices all require special preparation or presentation of the picture and the use of special equipment by the viewer. The special equipment is troublesome and objectionable and specially prepared pictures are expensive and in some cases completely worthless when not viewed with the special equipment.

This invention causes the illusion of depth to be created or enhanced in a two-dimensional picture without the necessity for the viewer of the picture using special equipment and without special preparation of the picture. It is a framing for two-dimensional pictorial material of any type and when used in connection with a photograph, a painting, a picture projected on a screen, a television image, or any other two-dimensional presentation of pictorial material, it creates the distinct illusion of depth or three dimensions. The specific embodiment of the invention will vary according to the type of pictorial material with which it is used, but in every case it will be characterized by limiting the pictorial presentation on at least one edge with a boundary which is not parallel to either the horizontal or vertical axis of the pictorial material.

These and other features and advantages of the invention will be more clearly understood from the following detailed description and the accompanying drawings in which like characters of reference designate corresponding parts in all figures, and in which.

These figures and the following detailed description disclose a preferred specific embodiment of the invention, but the invention is not limited to the details disclosed since it may be embodied in other equivalent forms.

Figure 1:
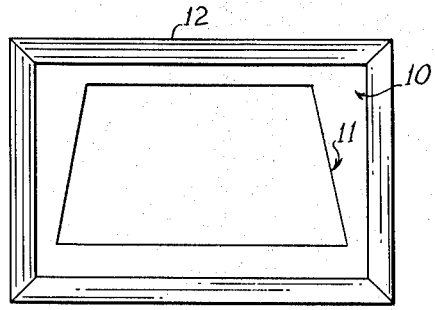
FIG. 1 is a front elevation view of the framing used with a two-dimensional picture in a conventional picture frame.
Figure 2:
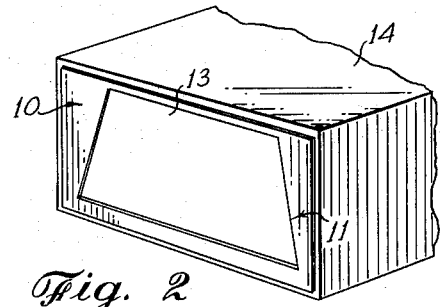
FIG. 2 is a perspective view of the framing used with the two-dimensional image on the screen of a conventional television receiver.
Figure 3:
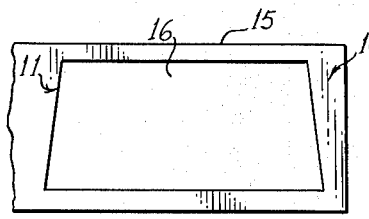
FIG. 3 is an elevational view of the framing embodied as the page of an album for mounting two-dimensional pictures.

This invention is best understood as a framing 10 for a two-dimensional presentation of pictorial material and which has at least one picture limiting border 11 that is not parallel to either the actual or assumed vertical or horizontal axis of the pictorial material. The framing 10 may be a mat placed between the picture and the glass in a picture frame 12 as shown in FIG. 1, or it may be a mask applied to the front 13 of a conventional television receiver 14 as shown in FIG. 2. Similarly, it may be the page 15 of a picture album having an aperture 16 through which the picture is seen as shown in FIG. 3. The framing 10 may also be a plate having a hole through which pictorial material is projected onto a flat surface or through which pictorial material is photographed or otherwise recorded for presentation on a two-dimensional surface or it may be simply that portion of a page in a magazine or book not occupied by the pictorial material with which the framing is used.

In every embodiment, the framing 10 has picture limiting borders 11 which define the edges of the pictorial material and at least one of which is not parallel to either of the real or assumed axes of the pictorial material. It has been found that the best configuration of the picture limiting borders 11 for a particular arrangement of pictorial material will vary with the nature of the pictorial material with which the framing 10 is being used.

It has also been found that placing the framing 10 and the pictorial material in two distinctly different planes or using translucent material for the framing 10 will further enhance the illusion of depth otherwise created with certain types of pictorial material by the framing 10. A translucent mask placed on the protective glass cover of a television receiver in front of the plane of the picture tube as shown in FIG. 2 provides a particularly strong illusion of depth. Moreover, where the framing 10 is used with pictorial material such as the image on a television receiver, it has been found that even designs or similar material on the framing 10 will not interfere with the illusion of depth. It has been found that where the framing 10 is no more than strips of tape or similar material surrounding the pictorial material, the illusion of depth is nevertheless strong.

In FIG. 4 some of the picture limiting border 11 configurations which have been found to create a strong illusion of depth with various arrangements of pictorial material are shown. FIG. 4a schematically shows a framing 10 where the upper limiting border 17 and lower limiting border 18 are both parallel to the horizontal axis of the pictorial material, where neither the right limiting border 19 nor the left limiting border 20 is parallel to the vertical axis of the pictorial material and where the right limiting border 19 and left limiting border 20, if extended, would converge above the upper limiting border 17 to form an isosceles triangle with the lower limiting border 18. In FIG. 4b, the configuration of the picture limiting borders 11 is similar to that shown in FIG. 4a with the exception that the isosceles triangle would be formed by the right limiting border 19, left limiting border 20 and upper limiting border 17.

Figure 4A:
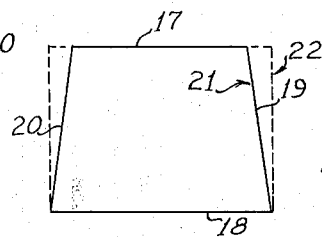
FIG. 4 is a series of schematic presentations of various configurations for the picture limiting borders of the framing and with the edge of the picture shown in dashed outline where the edge of the picture does not coincide with the border.
Figure 4B:
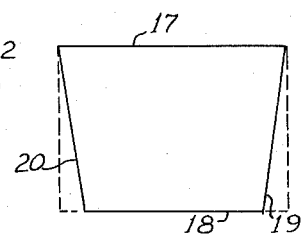
Figure 4C:
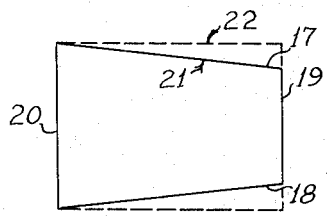
Figure 4D:
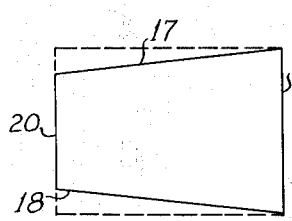
Figure 4E:
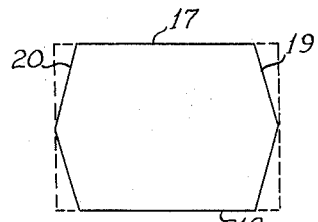
Figure 4F:
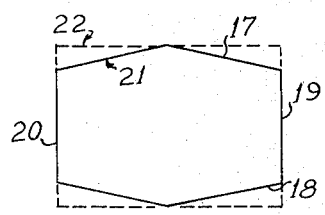
Figure 4G:
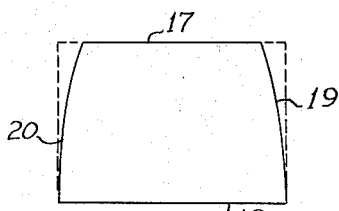
Figure 4H:
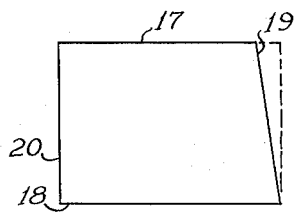
Figure 4I:
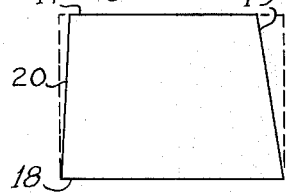

The configurations of the limiting borders 11 of the framing 10 schematically shown in FIG. 4g, FIG. 4h, and FIG. 4i are similar to that shown in FIG. 4a with the exception that the configurations sohwn in FIG. 4h and FIG. 4i would result in triangles with unequal sides if the right limiting border 19 and left limiting border 20 were extended and the configuration in FIG. 4g has the right limiting border 19 and left limiting border 20 curving rather than straight as in FIG. 4a.

In FIG. 4c and FIG. 4d are shown configurations of the picture limiting borders 11 where the right limiting border 19 and the left limiting border 20 are both parallel to the vertical axis of the pictorial material and where it is the upper limtiing border 17 and lower limiting border 18 which would converge at a point if extended. In FIG. 4e and FIG. 4f the picture limiting borders 11 would converge at two points rather than one if extended.

These are but a few of the configurations of the picture limiting borders 11 of the framing 10 which are possible. Although the configuration shown in FIGS. 1, 2, 3, and 4a produces good results with most pictorial material, it has been found that the other configurations shown and which are possible within the scope of the invention will produce the maximum illusion of depth with certain pictorial material. The optimum configuration of the picture limiting borders 11 is a matter of empirical selection.

Regardless of the specific configuration of the picture limiting borders 11 used, the framing 10 defines the edges of the pictorial material in such a manner that at least one of the edges 21 of the pictorial material is not parallel to either the vertical or horizontal axis of the pictorial material. It is this changing by the framing 10 of at least one edge 21 from its actual or conventional position 22 parallel to either the horizontal or vertical axis of the pictorial material which results in the creating or enhancing of the illusion of depth in the pictorial material. This has been found to be true whether the pictorial material is a photograph, a projected picture, a television picture, or any other two dimensional presentation of pictorial material.

It will be obvious to those skilled in the art that many variations may be made in the embodiments here chosen for the purpose of illustrating the present invention without departing from the scope thereof as defined by the appended claims.

What is claimed as invention is:

1. A picture and frame combination comprising: a two-dimensional pictorial presentation having vertical and horizontal axes and including a first portion as foreground material and a second portion as background material and, a frame having a trapezoidal aperture therein defined by a pair of parallel sides and a pair of non-parallel sides, said trapezoidal aperture being disposed about said two-dimensional pictorial material so that one of said non-parallel sides of said trapezoidal aperture is positioned in non-parallel relation to both said vertical and horizontal axes so as to create a distinct third dimensional illusion of depth.

2. A picture and frame combination as set forth in claim 1 and further characterized in that said parallel sides of said trapezoidal apertures define the upper and lower boundary of said frame and are aligned parallel to said horizontal axis.

3. A picture and frame combination as set forth in claim 2 and further characterized in that said lower boundary is of greater length than said upper boundary.

4. A picture and frame combination comprising: a two-dimensional pictorial presentation having vertical and horizontal axes and including a first portion as foreground material and a second portion as background material and, a frame having a trapezoidal aperture therein defined by a pair of parallel sides and a pair of non-parallel sides, said aperture being disposed about said two-dimensional pictorial material so that the longer of the parallel sides is related to the foreground material and the other sides of the frame are related to the background material so as to create a perception to the viewer of a distinct third dimensional illusion of depth.

References Cited by the Examiner

UNITED STATES PATENTS

| | | | |
|---|---|---|---|
| 131,260 | 9/1872 | Fitzgibon | 40—159 |
| 675,558 | 6/1901 | Engel | 40—152 |
| 743,984 | 11/1903 | Knothe | 40—159 X |
| 882,710 | 3/1908 | Pearsall | 40—158 |
| 1,094,923 | 4/1914 | Palmer | 129—20 |
| 1,225,195 | 5/1917 | Wanda | 40—152 |
| 2,252,632 | 8/1941 | Jones | 40—158 X |
| 2,259,272 | 10/1941 | Sholkin et al. | 40—152 X |
| 2,842,882 | 7/1958 | Greene et al. | 40—158 |

EUGENE R. CAPOZIO, *Primary Examiner.*

JEROME SCHNALL, *Examiner.*